US012762144B2

(12) United States Patent
Dhanyamraju et al.

(10) Patent No.: US 12,762,144 B2
(45) Date of Patent: Oct. 13, 2026

(54) MULTI-DIMENSIONAL HIERARCHICAL DATA STRUCTURES FOR ANALYSIS AND COMPREHENSION USING LARGE LANGUAGE MODELS

(71) Applicant: SAP SE, Walldorf (DE)

(72) Inventors: Harsh Rao Dhanyamraju, Singapore (SG); Wei Ming Neo, Singapore (SG); Rajesh Vellore Arumugam, Singapore (SG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 19/015,894

(22) Filed: Jan. 10, 2025

(65) Prior Publication Data

US 2026/0203297 A1 Jul. 16, 2026

(51) Int. Cl.
*G06F 16/25* (2019.01)
*G06F 16/22* (2019.01)

(52) U.S. Cl.
CPC ........ *G06F 16/258* (2019.01); *G06F 16/2246* (2019.01); *G06F 16/2264* (2019.01)

(58) Field of Classification Search
CPC . G06F 16/258; G06F 16/2246; G06F 16/2264
USPC .......................................................... 707/756
See application file for complete search history.

(56) References Cited

U.S. PATENT DOCUMENTS

2019/0384762 A1* 12/2019 Hill ..................... G06F 16/2272
2024/0274286 A1* 8/2024 Chen ...................... G16H 50/70
2024/0320445 A1* 9/2024 Mallick .................. G06F 40/30
2024/0386202 A1* 11/2024 Hoffman ................. G06F 40/30
2025/0013618 A1* 1/2025 Li .......................... G06F 16/22
2025/0094480 A1* 3/2025 Shi ........................ G06F 16/334
2025/0200050 A1* 6/2025 Tenkale ............ G06F 16/24568
2025/0201375 A1* 6/2025 Basir ...................... G16H 20/10
2025/0209416 A1* 6/2025 Muthu ................. G06Q 10/087
2025/0225804 A1* 7/2025 Thapa .................... G06V 30/41
2025/0315453 A1* 10/2025 Karasudha Patnaik ...................... G06F 16/287
2026/0111466 A1* 4/2026 Zabuawala ......... G06F 16/3344

* cited by examiner

*Primary Examiner* — Giovanna B Colan
(74) *Attorney, Agent, or Firm* — Fish & Richardson P.C.

(57) ABSTRACT

Methods, systems, and computer-readable storage media for retrieving data from a data store, the data being in a storage format and including multiple dimensions in a hierarchy, at least one dimension having a sub-hierarchy, converting the data from the storage format to an analytics format including a set of nodes, each node representing a dimension of the multiple dimensions, a set of hierarchy characters, one or more hierarchy characters separating two or more nodes to represent a hierarchical relationship between nodes, and an attribute delimiter to separate attribute values of a node, generating a prompt that references the data in the analytics format, transmitting the prompt to a LLM system, and receiving a response to the prompt from the LLM system.

20 Claims, 6 Drawing Sheets

300

MULTI-DIMENSIONAL HIERARCHICAL DATA STRUCTURES FOR ANALYSIS AND COMPREHENSION USING LARGE LANGUAGE MODELS

BACKGROUND

Entities, such as commercial enterprises, use software systems to conduct operations. Example software systems can include, without limitation, enterprise resource management (ERP) systems, customer relationship management (CRM) systems, human capital management (HCM) systems, and the like. Enterprises continuously seek to improve and gain efficiencies in their operations. To this end, enterprises integrate systems in the domain of so-called intelligent enterprise, which can employ artificial intelligence (AI) that can include, for example, machine learning (ML) models and/or generative AI (GAI). For example, GAI, such as large language models (LLMs) can be used for data analytics and/or automating tasks in support of enterprise operations. AI, however, presents technical hurdles and risks that need to be mitigated in use by enterprises.

SUMMARY

Implementations of the present disclosure are generally directed to enabling use of LLMs for processing complex, multi-dimensional, hierarchical data for analytics. More particularly, implementations of the present disclosure are directed to table serialization to convert complex, multi-dimensional, hierarchical data to a format, referred to as hierarchical comma-separated values (HCSV) format. The HCSV format can also be referred to as an analytics format. As described in further detail herein, the HCSV format is a data structure that is based on a file system representation for representing a hierarchy for each dimension represented in data, where the file system representation is adapted to represent hierarchies across multiple dimensions, one or more dimensions having sub-hierarchies.

In some implementations, actions include retrieving data from a data store, the data being in a storage format and including multiple dimensions in a hierarchy, at least one dimension having a sub-hierarchy, converting the data from the storage format to an analytics format including a set of nodes, each node representing a dimension of the multiple dimensions, a set of hierarchy characters, one or more hierarchy characters separating two or more nodes to represent a hierarchical relationship between nodes, and an attribute delimiter to separate attribute values of a node, generating a prompt that references the data in the analytics format, transmitting the prompt to a LLM system, and receiving a response to the prompt from the LLM system. Other implementations of this aspect include corresponding systems, apparatus, and computer programs, configured to perform the actions of the methods, encoded on computer storage devices.

These and other implementations can each optionally include one or more of the following features: the data is retrieved from the data store in response to determining that a review booklet is open concurrent with receiving a query from a user; at least one dimension of the multiple dimensions includes a sub-hierarchy represented using a sub-set of hierarchy characters of the set of hierarchy characters; the prompt includes a query submitted by a user; the prompt includes a chain-of-thought (CoT) prompt; the set of hierarchy characters comprises —, ⊢, ∈, and |; and the attribute delimiter includes a semi-colon.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
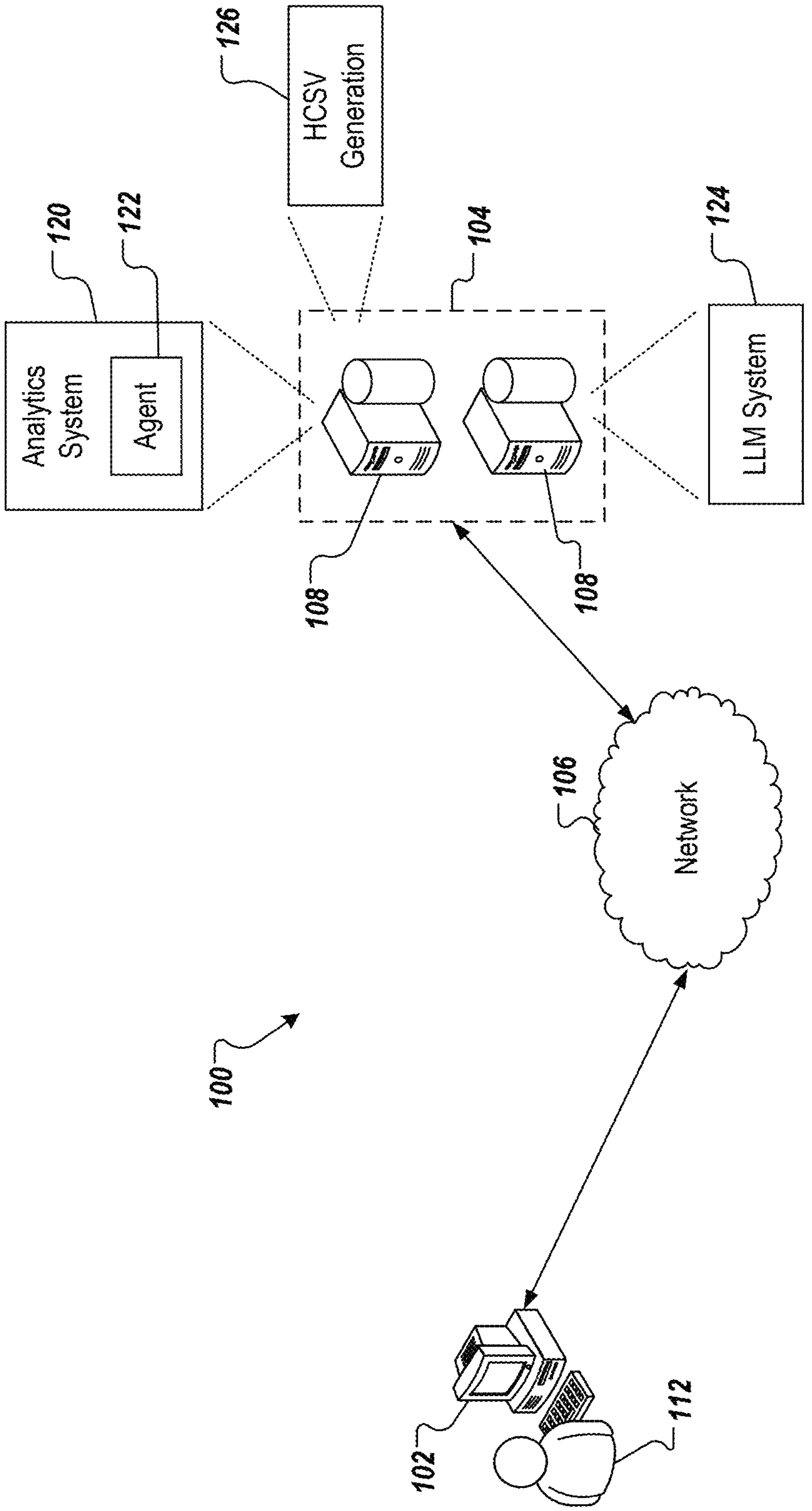
FIG. 1 depicts an example architecture that can be used to execute implementations of the present disclosure.

Implementations of the present disclosure are generally directed to enabling use of LLMs for processing complex, multi-dimensional, hierarchical data for analytics. More particularly, implementations of the present disclosure are directed to table serialization to convert complex, multi-dimensional, hierarchical data to a format, referred to as hierarchical comma-separated values (HCSV) format. The HCSV format can also be referred to as an analytics format. As described in further detail herein, the HCSV format is a data structure that is based on a file system representation for representing a hierarchy for each dimension represented in data, where the file system representation is adapted to represent hierarchies across multiple dimensions, one or more dimensions having sub-hierarchies.

Implementations can include actions of retrieving data from a data store, the data being in a storage format and including multiple dimensions in a hierarchy, at least one dimension having a sub-hierarchy, converting the data from the storage format to an analytics format including a set of nodes, each node representing a dimension of the multiple dimensions, a set of hierarchy characters, one or more hierarchy characters separating two or more nodes to represent a hierarchical relationship between nodes, and an attribute delimiter to separate attribute values of a node, generating a prompt that references the data in the analytics format, transmitting the prompt to a LLM system, and receiving a response to the prompt from the LLM system.

Implementations of the present disclosure are described in further detail herein with non-limiting reference to complex, hierarchical data structures represented in review booklets provided by SAP SE of Walldorf, Germany. In general, review booklets can be described as recording complex, hierarchical data of enterprises in structured format (e.g., using views on one or more tables stored in a database system). More particularly, review booklets can be used by users (e.g., agents/employees of enterprises) to display, analyze, and validate data. Review booklets present an aggregated view of data by combining predefined pages and can be described as representing a next generation of multi-dimensional analytical applications. For example, review booklets reuse analytical components, content, and features from disparate components of an eco-system (e.g., a cloud-based analytics system and a database system) to ensure consistency between the components. While implementations of the present disclosure are described in further detail herein with non-limiting reference to review booklets, it is contemplated that implementations of the present disclosure can by realized with any appropriate representation of complex, hierarchical data structures.

To provide further context for implementations of the present disclosure, and as introduced above, in the field of artificial intelligence (AI), so-called generative AI (GAI) has recently seen an explosion in popularity. GAI can be described as including foundation models that generate content based on training data. For example, foundation models can include LLMs, which are a form of GAI that can be used to generate text and perform other functions for a variety of use cases. The increasing power and popularity of GAI has seen enterprises seeking avenues to leverage GAI in improving enterprise operations. However, integrating GAI into enterprise platforms is a non-trivial task, because GAI presents various technical challenges, disadvantages, and limitations that have to be managed, which did not exist in the pre-GAI world.

For example, complex, hierarchical data structures, such as those represented in review booklets, represent a next generation of multi-dimensional analytical applications and are constructed to enable, for example, complex analytics for answering questions. For example, and in the context of financials of enterprise operations, data recorded in review booklets can be used to provide financial statements, such as balance sheets, profit and loss statements, cash flow statements, and the like. With the above-discussed push towards integrating GAI for various use cases, LLMs can be leveraged with review booklets to enable users to gain quick and technically efficient AI-assisted insight into data recorded in review booklets.

However, while LLMs excel at tasks involving natural language, performance of LLMs in processing structured data, such as tables recorded in review booklets, is significantly lacking. For example, while common table serialization techniques, such as comma separated values (CSV), Javascript Object Notation (JSON), and natural language, have been used for representing simple tables, such traditional techniques cannot be directly applied to data that includes multi-dimensional hierarchies. This is often the case for review booklets.

By way of non-limiting example, financial data can be considered, which encompasses multiple dimensions, such as time, accounts, regions, currencies, and the like. Representing such dimensions in a linear text format demands complex structuring, which is not intuitive. Additionally, some dimensions can contain their own hierarchies, which can be referred to as sub-hierarchies. Serializing such hierarchical relationships into text requires meticulous nesting or the use of specific conventions to maintain clarity and preserve structure. Without effective table serialization techniques, performance of LLMs lags, as the LLMs can be confused between the different hierarchies, which impedes effective navigation within the data and analysis of the data. This renders LLMs impractical, even unusable, for use cases that include processing structured data with hierarchies and sub-hierarchies, for example.

While some approaches can mitigate the above-described deficiencies, such approaches cannot resolve the deficiencies and are time- and resource-inefficient. An example approach includes fine-tuning of LLMs. However, such an approach not only increases time, but also requires a significant expenditure of technical resources (e.g., processing, memory, bandwidth) to execute the fine-tuning process. Even fine-tuned, above-discussed deficiencies of LLMs in processing complex, hierarchical data structures can still persist.

In view of the above context, implementations of the present disclosure provide a table serialization technique to convert data to a format, referred to as hierarchical comma-separated values (HCSV) format, for multi-dimensional hierarchical data (e.g., financial data of enterprises). As described in further detail herein, the HCSV format is a data structure that is based on a file system representation (e.g., the Unix file system representation) for representing a hierarchy for each dimension. The file system representation is adapted to represent hierarchies across multiple dimensions. Conversion of data to the HCSV format of the present disclosure is straightforward to implement (e.g., can be seamlessly integrated into existing workflows), is scalable, and is token-efficient (e.g., minimizing a number of tokens provided to LLMs, and thus expenditure of technical resources). As described in further detail herein, the HCSV format of the present disclosure enables improved understanding by LLMs on multi-dimensional hierarchical data without incurring additional costs in terms of technical resource expenditure (e.g., memory, processing, bandwidth).

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, and as noted above, the server system 104 can host an analytics system 120 that enables users (e.g., the user 112) to review data, such as data represented in review booklets, and submit queries for analytics on the data. For example, the analytics system 120 can include an AI-based agent 122 (e.g., Joule provided by SAP SE) that interacts with users in natural language conversations. For example, the AI-based agent 122 can receive queries from users, generate prompts based on the queries, and prompt a LLM system 124, which returns a response that can be used to respond to the queries.

In accordance with implementations of the present disclosure, the server system 104 can host an HCSV generation component 126 that converts complex, hierarchical data structures into HCSV format. For example, and as described in further detail herein, data in a data structure (e.g., as represented in review booklets) can be converted to HCSV format for inclusion with a prompt to the LLM system 124 to enable improvement in performance of the LLM system 124 in processing the data. While the HCSV generation component 126 is depicted as separate from the analytics system 120 in FIG. 1, it is contemplated that the HCSV generation component 126 can be incorporated into any appropriate system, such as the analytics system 120.

Figure 2:
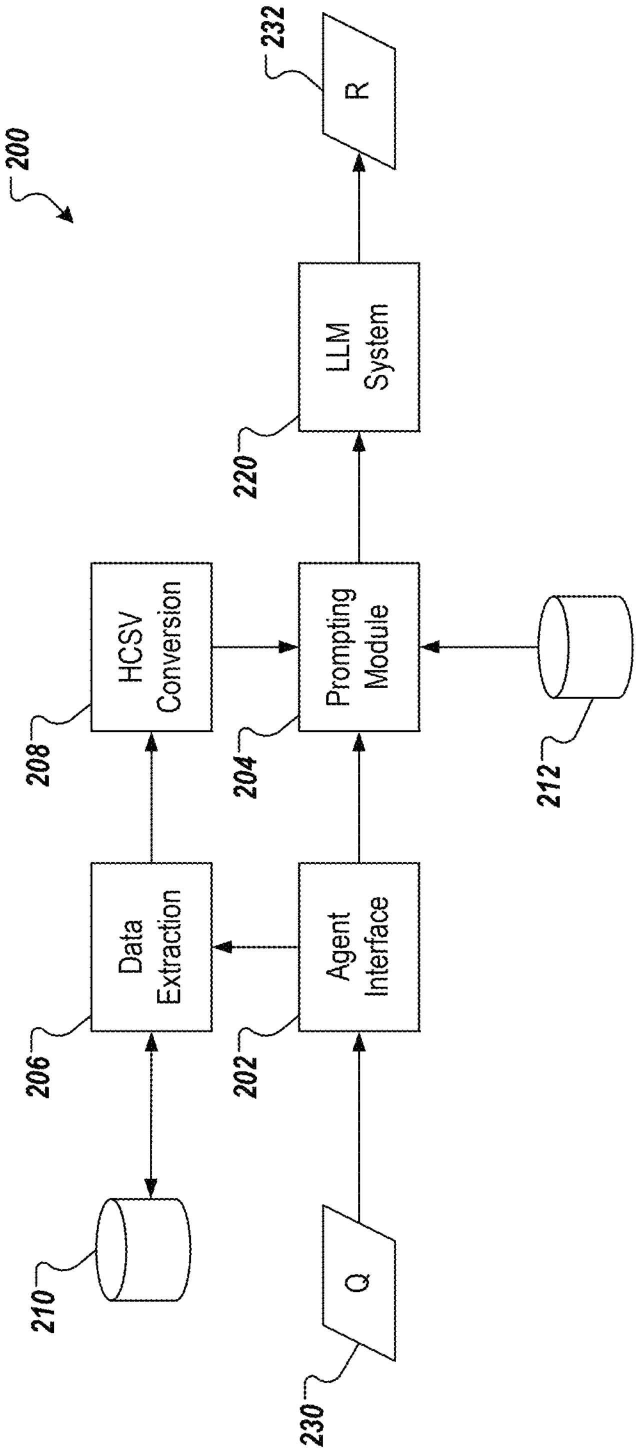
FIG. 2 depicts an example conceptual architecture in accordance with implementations of the present disclosure.

FIG. 2 depicts an example conceptual architecture 200 in accordance with implementations of the present disclosure. In the depicted example, the example conceptual architecture 200 includes an agent interface 202, a prompting module 204, a data extraction module 206, an HCSV conversion module 208, a review booklet data store 210, and a prompt template repository 212. The example of FIG. 2 further includes a LLM system 220 (e.g., the LLM system 124 of FIG. 1). In some examples, the LLM system 220 is provisioned by a third-party service provider (e.g., ChatGPT provided by OpenAI). As described in further detail herein, a query 230 is received from a user (e.g., the user 112 of FIG. 1), which results in a prompt to the LLM system 220, which returns a response 232 to the prompt. As also described in further detail herein, the prompt is at least partially generated based on the query 230. As such, the response 232 is responsive to the query 230.

Figure 3:
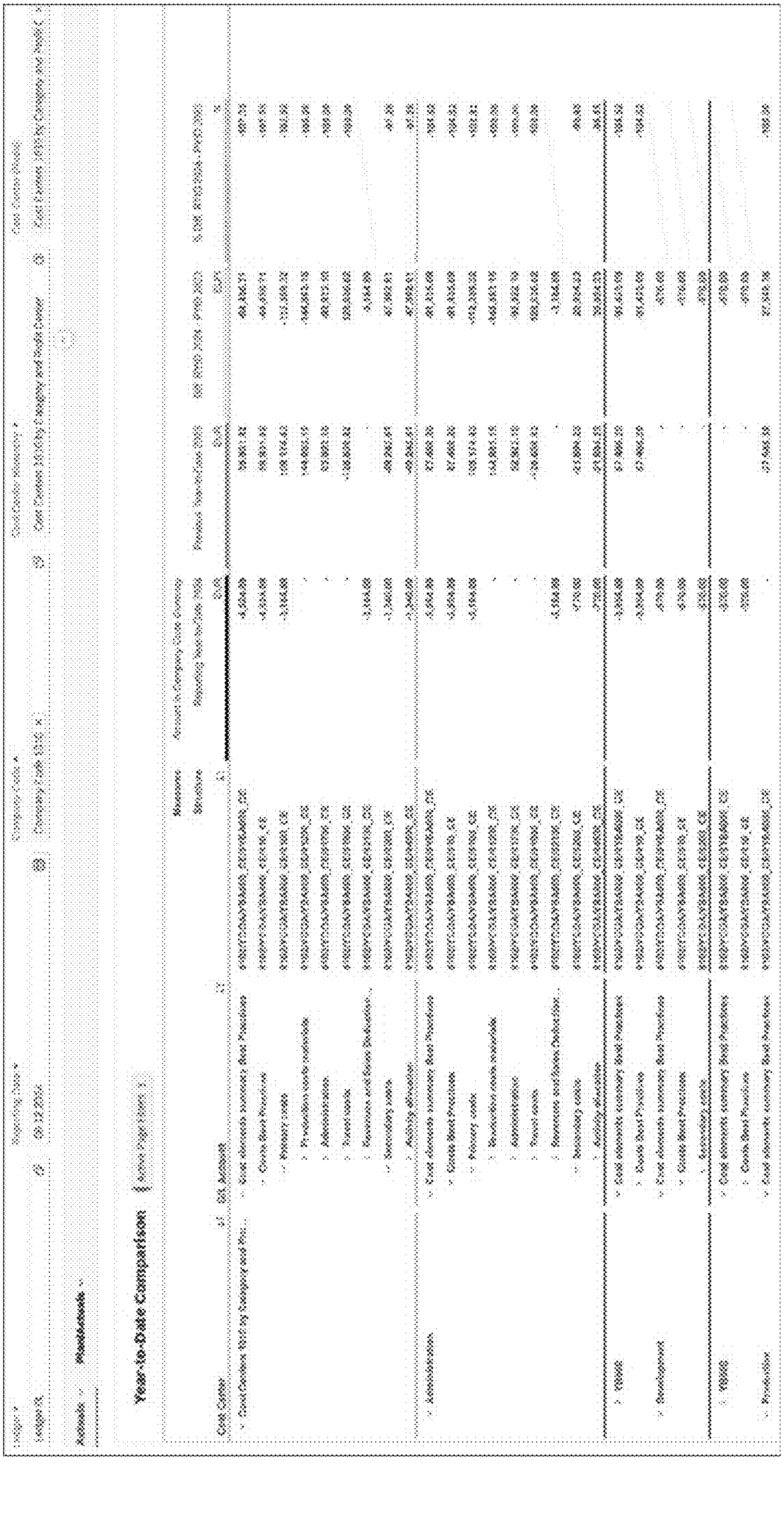
FIG. 3 depicts an example user interface displaying an example page of a review booklet.
Figure 4:
FIG. 4 depicts an example data conversion in accordance with implementations of the present disclosure.

For purposes of illustration, implementations of the present disclosure are described in further detail herein with non-limiting reference to examples of FIGS. 3 and 4.

FIG. 3 depicts an example user interface (UI) 300 displaying an example page of a review booklet. The example of FIG. 3 depicts financial data for a cost center of an enterprise. In some examples, the review booklet (such as that depicted in FIG. 3) can be open concurrent with the AI-based agent (e.g., in a front-end UI executed on a client computing device, such as the client device 102 of FIG. 1). The user can submit the query 230 to the AI-based agent through the agent interface 202.

In some examples, the review booklet is a cost center review booklet, such as that of FIG. 3, and can include, by way of non-limiting example, two dimensions, namely, region and cost center. In this example, each dimension has its own independent hierarchy. In this example, reporting year-to-date (RYTD) and previous year-to-date (PYTD) are provided and are the data columns (attributes) for each row (node). As described herein, the data of the review booklet is converted into the data structure of the HCSV format of the present disclosure.

FIG. 4 depicts an example data conversion in accordance with implementations of the present disclosure. In the example of FIG. 4, the example cost center review booklet is represented as a visualization 400, which illustrates the multiple dimensions and individual hierarchies. A visualization 402 represents the data as converted to the HCSV format of the present disclosure.

In further detail, the HCSV format leverages concepts similar to CSV and Unix file structures, to enhance accessibility and ease of use of the data by LLMs. The HCSV format of the present disclosure includes characteristics of multi-dimensional hierarchical data, node representation, parent-child relationships, and structure and separation. More particularly, and as described herein, the HCSV format supports the representation of multi-dimensional hierarchical data, where each dimension can have its own independent hierarchy (e.g., sub-hierarchy).

With regard to node representation, each row in the data represents a node in the hierarchy. Each node belongs to multiple hierarchies, one for each dimension, and contains a set of attributes. With regard to parent-child relationships, each node has a parent node in every dimension to establish clear hierarchical relationships within the data. With regard to structure and separation, different dimensions are separated by a delimiter, depicted as "—" in the visualization 402 of FIG. 4. Attributes of each node are separated by a delimiter, depicted as a semi-colon ";" in the visualization 402 of FIG. 4. Use of a semi-colon to separate row values (e.g., instead of a comma, as with CSV) enables commas to be used for expressing large numbers (e.g., thousands, hundreds of thousands, millions).

With continued reference to the examples of FIG. 4, the following example interpretation can be provided for the cost centers. For example, for the APAC region:

Total spending increased from 345 EUR to 1092 EUR, of which:
- Marketing spending decreased from 313 EUR to 288 EUR, of which:
  - Social Media spending decreased from 178 EUR to 110 EUR.
  - Events spending increased from 135 EUR to 178 EUR.
- R&D spending increased from 32 EUR to 804 EUR.

As another example, for Singapore (region under APAC→SEA):

Total spending increased from 214 EUR to 349 EUR, of which:
- Marketing spending decreased from 194 EUR to 107 EUR, of which:
  - Social Media spending decreased from 102 EUR to 40 EUR.
  - Events spending decreased from 92 EUR to 67 EUR.
- R&D spending increased from 20 EUR to 242 EUR.

Marketing in Singapore contributes to Total in Singapore (parent in cost center dimension) and Marketing in SEA (parent in region dimension).

Referring again to FIG. 2, a user can interact with an AI-based agent (e.g., Joule) through the agent interface 202.

In some examples, the user can have a review booklet open for review concurrent with interactions with the AI-based agent. The user can submit the query 230 to the AI-based agent in order to initiate analysis of the data of the review booklet. An example query can include:

What are the drivers of Marketing in APAC in 2024?

In some examples, the query 230 is received by the agent interface 202. In response to the query 230, the agent interface 202 can initiate prompting of the LLM system 220.

In some implementations, the AI-based agent can determine whether the query 230 is received concurrently with a review booklet being open for review by the user. For row-by-row basis. For each row, the appropriate indentation is determined and the corresponding formatted text is output to a .TXT file. Each line is preceded by the ⊢ character following the determined indentation. Upon completion, an intermediate TXT dataset is provided. In the backward pass stage, the intermediate TXT dataset is traversed in reverse order, starting from the last row. Replace the ⊢ character is replaced with the ∈ character, if it is the last occurrence in its respective column from the bottom up. Any empty spaces within the same column are filed in with the | character until encountering a filled position.

An example algorithm for converting from a storage format (CSV) to the HCSV format can be provided as:

Listing 1: Example Conversion Algorithm

```
Input: CSV file
dataframe ← read_csv(“input_file.csv”)                       // Preprocessing
determine_hierarchy_level(dataframe)
lines ← ‘’
for row in dataframe.iterrows( ) do                          // Forward Pass
    indentation ← determine_indentation(row)
    lines.append(indentation + ‘├ ’ row_to_string(row) + ‘\n’)
end for
lines ← lines.split( )
for i in range(len(lines) − 1, −1, −1) do                    // Backward Pass
    line ← lines(i)
    if is_first_occurrence_in_hierarchy(line) then
        lines[i] ← line.replace(‘├ ’, ‘└ ’, 1)
    end if
    for j in range(i − 1, −1, −1) do
        if should_populate_vertical_line(lines[j]), line) then
            lines[j] ← populate_vertical_line(lines[j])
        end if
    end for
end for
output_file ← open(“output.txt”, “w”)                        // Save File
output_file.writelines(lines)
output_file.close( )
```

example, and as discussed herein, the user can have a review booklet open (e.g., in a front-end). In some examples, each review booklet is assigned a unique identifier. Accordingly, the AI-based agent can determine, from the front-end, whether a review booklet is open and, if a review booklet is open, the unique identifier of the review booklet.

If a review booklet is open, the AI-based agent (e.g., the agent interface) provides instructions to the data extraction module 206 to extract data for the review booklet. In some examples, the instructions include the unique identifier assigned to the review booklet. In some examples, the data extraction module 206 queries the review booklet data store 210 for the data that populates the review booklet. As described herein, the data can be in a storage format (e.g., CSV). The data is provided to the HCSV conversion module 208, which converts the data from the storage format to the HCSV format of the present disclosure provide converted data.

In some implementations, format conversion includes multiple stages, example stages including preprocessing, forward pass, and backward pass. In preprocessing a file provide in a storage format (e.g., CSV) is converted to an intermediate data structure. In some examples, the intermediate data structure is a two-dimensional and can include, for example, the Pandas DataFrame. During preprocessing, the hierarchical level for each row across all dimensions within the intermediate data structure are determined and recorded. In some examples, any columns deemed unnecessary for subsequent processing can be removed. In the forward pass stage, the intermediate data structure is traversed on a Listing 1: Example Conversion Algorithm Here, \n represents a new line character (e.g., equivalent to pressing enter on a keyboard), and w stands for a write mode to enable writing to a file.

In some examples, the converted data is provided to the prompting module 204. For example, the converted data can be provided to the prompting module 204 directly from the HCSV conversion module 208. As another example, the HCSV conversion module 208 provides the converted data to the agent interface 202, which provides the converted data to the prompting module 204.

In some implementations, the agent interface 202 triggers the prompting module 204 to prompt the LLM system 220. If a review booklet was open when the query 230 was received, and converted data is provided, the prompting module 204 generates a prompt that includes at least a portion of the converted data. Otherwise, the prompt is generated without converted data. In some examples, the prompting module 204 generates a prompt using a prompt template retrieved from the prompt template repository 212. In some examples, if converted data is included, a prompt template that includes a placeholder for converted data is selected.

In further detail, the prompt template can include static text (e.g., same text for each prompt that is to be generated) and placeholders. In some examples, the static text defines the task that is to be performed by the LLM system 220 (e.g., provide an analytics result responsive to the query) and other instructions for processing the prompt (e.g., use chain-of-thought (CoT) in generating a response). In some examples, the prompt is generated by populating a placeholder with the user query and one or more placeholders with the converted data returned from the HCSV conversion module 208. An example prompt can be provided as:

You are uniquely qualified to navigate, comprehend, and analyze the complex hierarchies of tabular financial data. Follow the instructions carefully.

The following is a Cost Center review booklet data with a hierarchical structure:

```
<data>
Region — Cost Center;RYTD 2024 (EUR);PYTD 2023 (EUR)
APAC — Total;1092;345
|            |— Marketing;288;313
|            |      |— Social Media;110;178
|            |      |— Events;178;135
|            |— R&D;804;32
|— SEA — Total;426;339
|     |          |— Marketing;177;307
|     |          |     |— Social Media;68;177
|     |          |     |— Events;109;130
|     |          |— R&D;249;32
|     |— Singapore — Total;349;214
|     |                      |— Marketing;107;194
|     |                      |     |— Social Media;40;102
|     |                      |     |— Events;67;92
|     |                      |__R&D;242;20
|     |__ Malaysia — Total;77;125
|                        |— Marketing;70;113
|                        |      |— Social Media;28;75
|                        |      |— Events;42;38
|                        |— R&D;7;12
|—China — Total;666;6
                |— Marketing;111;6
                |     |— Social Media;42;1
                |     |— Events;69;5
                |— R&D;555;0
</data>
<query>
What are the drivers of Marketing in APAC in 2024?
</query>
```

Listing 2: Example Prompt

In the example of Listing 2, the example prompt directly incorporates the converted data in the HCSV format within the data placeholder. In some implementations, the data placeholder can include a filename of a file that stores the converted data in the HCSV format instead of the converted data itself. In this manner, the LLM system 220 can retrieve the converted data from the file.

In some implementations, the prompt can include CoT instructions that provide a step-by-step description of how the LLM system 220 is to generate the response. CoT prompting is a prompt engineering technique that aims to improve the performance of generally trained, non-domain specific LLMs on tasks requiring logic, calculation and decision-making by structuring the prompt in a way that mimics human reasoning. More particularly, CoT prompting is a prompting method used to encourage LLMs to not only output an answer, but also explain to the LLM the steps to be followed to derive the answer.

In some implementations, the prompting module 204 prompts the LLM system 220 by submitting the prompt to the LLM system 220 (e.g., through an application programming interface (API)). The LLM system 220 generates the response 232 by processing the prompt. An example response to the example prompt of Listing 1 can be provided as:

To answer this question, I'll analyze the Marketing data for APAC in 2024, looking at its components and their contributions.

For APAC in 2024:

Total Marketing: 288 EUR

Components of Marketing:

1. Social Media: 110 EUR
2. Events: 178 EUR

Analysis:

1. Events is the larger contributor at 178 EUR, representing about 61.8% of the total Marketing spend.
2. Social Media contributes 110 EUR, which is about 38.2% of the total Marketing spend.

The main driver of Marketing in APAC for 2024 is Events, accounting for the majority of the spending. However, both Events and Social Media are significant contributors, as they together make up the entire Marketing spend for APAC.

It's worth noting that the Marketing spend is split between two regions:

1. SEA (Southeast Asia): 177 EUR
2. China: 111 EUR

The higher spend in SEA suggests that it's a more significant driver of the overall APAC Marketing spend compared to China.

In summary, the main drivers of Marketing in APAC in 2024 are:

1. Events spending, particularly in the SEA region
2. Social Media spending, also with a higher focus in SEA
3. Overall, the SEA region is driving more of the Marketing spend than China Listing 3: Example Response In some implementations, the response 232 is returned to the user. For example, the response 232 can be provided to the agent interface 202, which returns the response 232 to the user (e.g., in the front-end).

Figure 5:
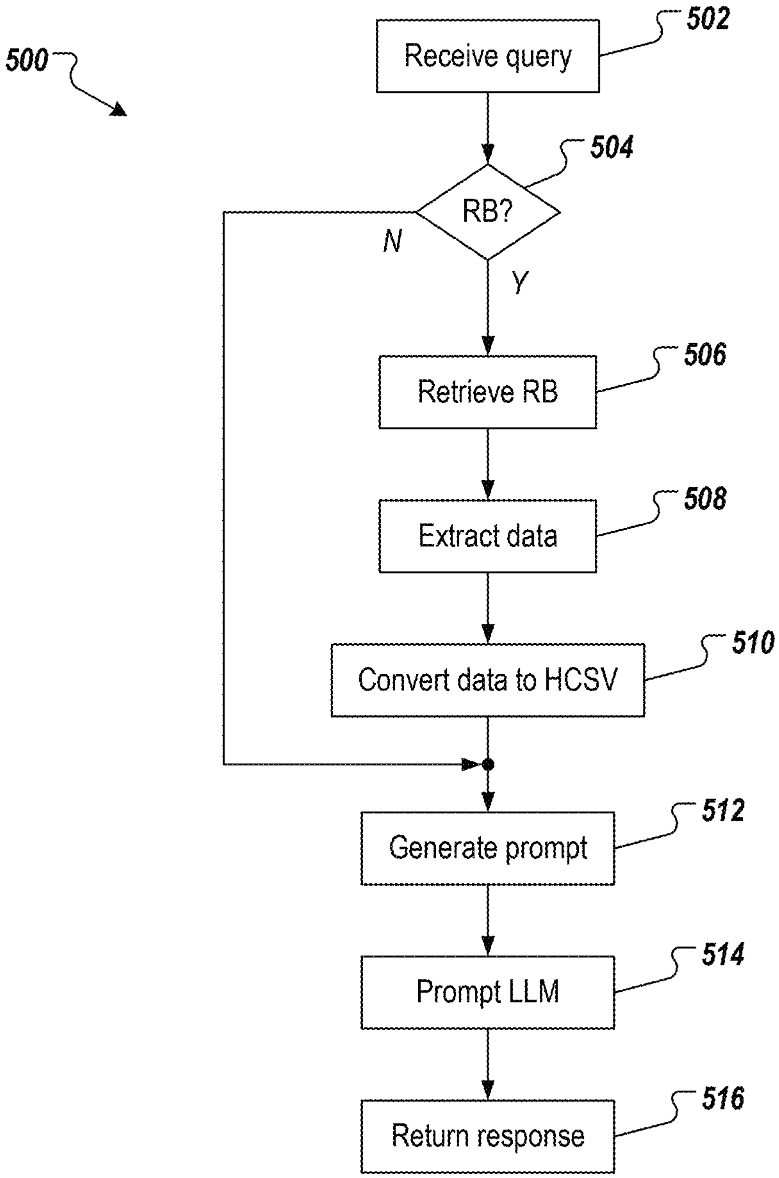
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

A query is received (502) and it is determined whether a review booklet is open (504). For example, and as described in detail herein with reference to FIG. 2, a user can interact with an AI-based agent (e.g., Joule) through the agent interface 202. In some examples, the user can have a review booklet open for review concurrent with interactions with the AI-based agent. The user can submit the query 230 to the AI-based agent in order to initiate analysis of the data of the review booklet. The AI-based agent can determine, from the front-end, whether a review booklet is open and, if a review booklet is open, the unique identifier of the review booklet.

If a review booklet is open, the review booklet is retrieved (506) and data of the review booklet is extracted (508). For example, and as described in detail herein, the AI-based agent (e.g., the agent interface) provides instructions to the data extraction module 206 to extract data for the review booklet. In some examples, the instructions include the unique identifier assigned to the review booklet. In some examples, the data extraction module 206 queries the review booklet data store 210 for the data that populates the review booklet. The data is converted to the HCSV format (analytics format) to provide converted data (510). For example, and as described in detail herein, the data is provided to the HCSV conversion module 208, which converts the data from the storage format to the HCSV format of the present disclosure provide the converted data.

A prompt is generated (512), a LLM is prompted (514), and a response is returned (516). For example, and as described in detail herein, the agent interface 202 triggers the prompting module 204 to prompt the LLM system 220. If a review booklet was open when the query 230 was received, and converted data is provided, the prompting module 204 generates a prompt that includes at least a portion of the converted data. In some examples, the prompting module 204 generates a prompt using a prompt template retrieved from the prompt template repository 212. The prompting module 204 prompts the LLM system 220 by submitting the prompt to the LLM system 220 (e.g., through an application programming interface (API)). The LLM system 220 generates the response 232 by processing the prompt.

If a review booklet is not open, a prompt is generated (512), a LLM is prompted (514), and a response is returned (516). For example, and as described herein, the prompt is generated without converted data (e.g., data in the HCSV format).

As described herein, implementations of the present disclosure provide multiple technical improvements. For example, implementations of the present disclosure enable LLMs to be used in use cases that LLMs would otherwise have poor performance and/or be unusable for. For example, implementations of the present disclosure provide improved multi-dimensional hierarchical understanding for LLMs. That is, and as compared to other common table serialization techniques, such as CSV and JSON, the LLM is better able to comprehend the multi-dimensional hierarchical nature of complex, hierarchical data in the HCSV format of the present disclosure. This leads to better quality responses and more accurate insights for the users and obviates technically expensive fine-tuning of LLMs.

As another example, the HCSV format of the present disclosure provides a clear separation between dimensions, whereby the different dimensions are separated by the "—" character. Further, the HCSV format of the present disclosure provides a clear difference between child nodes and attributes of current node. This is achieved by having a one-to-one mapping between each node and line, making an obvious distinction between a attributes of a node (same line) and attributes of its child nodes (different lines). Also, the HCSV format of the present disclosure provides a clear indication of each dimension's hierarchy (sub-hierarchies), where, for any row item, it is easy to tell its respective position in each of the hierarchies by following the "⊢", "∈", "|" characters.

Implementations of the present disclosure further enable scalability. For example, even if the number of hierarchies or dimensions grow, the HCSV format of the present disclosure enables serializing of the multi-dimensional hierarchy data. Further, the HCSV format of the present disclosure provides token efficiency by organizing data in a manner that maintains the hierarchical structure of each dimension while token-efficiently representing attributes associated with each node. This avoids the repetition of any column names and the use of any tags, offering a token-efficient way to represent multi-dimensional hierarchical data, which translates to cost efficiency in terms of reducing technical resources consumed. Moreover, and given the limited context window offered by an LLM, the number of data rows that can be represented with the HCSV format of the present disclosure will be greater than what could be possible with other common table serialization techniques, such as JSON and HTML.

Figure 6:
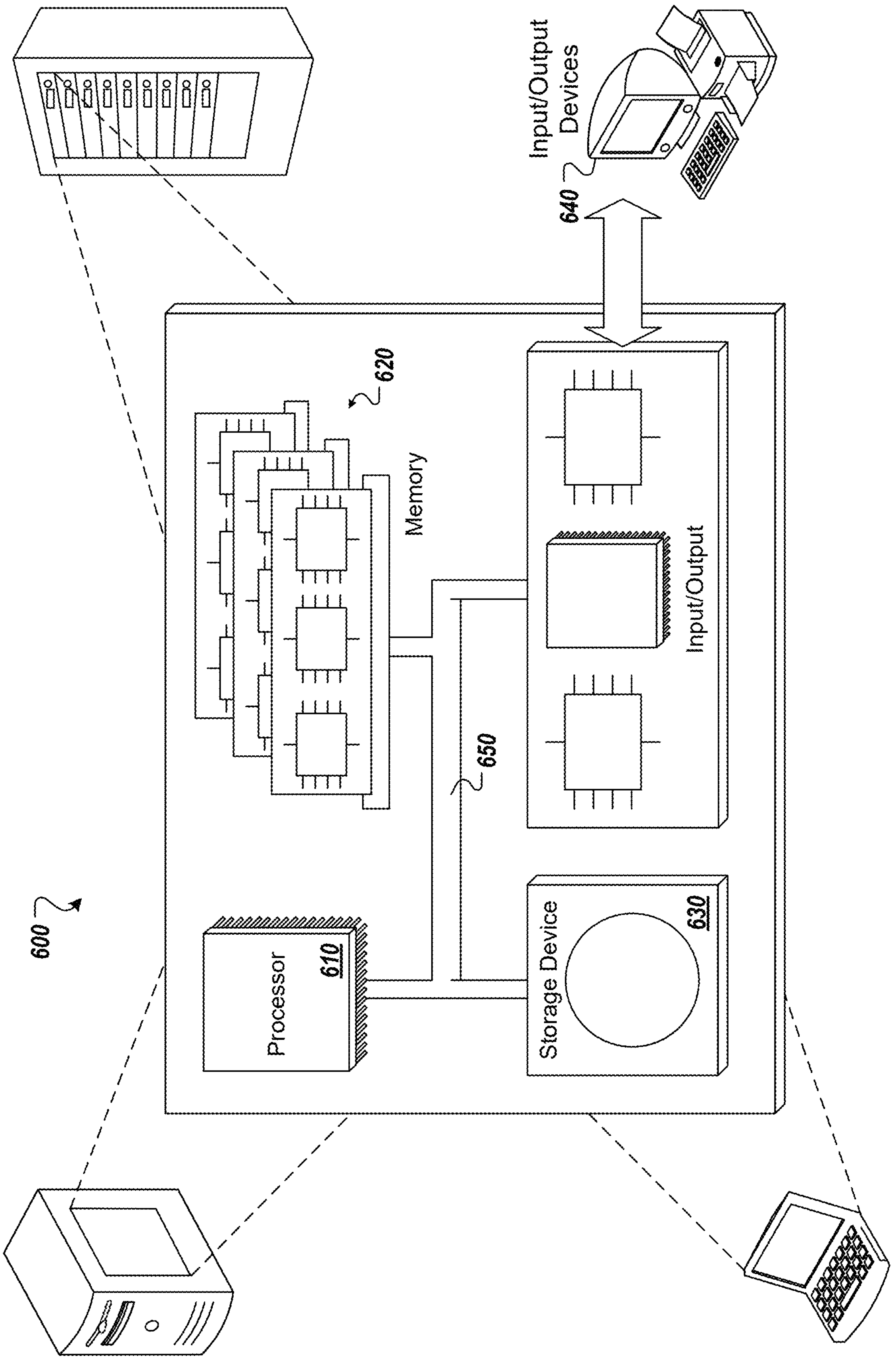
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing analytics over multi-dimensional, hierarchical data using large language models (LLMs), the method being executed by one or more processors and comprising:

- retrieving data from a data store, the data being in a storage format comprising multiple rows, the data comprising multiple dimensions in a hierarchy, at least one dimension having a sub-hierarchy, each dimension recorded in a row of the multiple rows;
- converting the data from the storage format to an analytics format by processing the data through preprocessing to convert the storage format to an intermediate data structure, a forward pass to traverse the intermediate data structure row-by-row and provide an intermediate text dataset, and a backwards pass to provide the analytics format from the intermediate text dataset, the analytics format comprising a set of nodes, each node representing a row of a dimension of the multiple dimensions, a set of hierarchy characters, one or more hierarchy characters separating two or more nodes to represent a hierarchical relationship between nodes as a parent node and child node relationship, and an attribute delimiter to separate attribute values of a node;
- generating a prompt that references the data in the analytics format;
- transmitting the prompt to a LLM system; and
- receiving a response to the prompt from the LLM system.

2. The method of claim 1, wherein the data is retrieved from the data store in response to determining that a review booklet is open concurrent with receiving a query from a user.

3. The method of claim 1, wherein at least one dimension of the multiple dimensions comprises a sub-hierarchy represented using a sub-set of hierarchy characters of the set of hierarchy characters.

4. The method of claim 1, wherein the prompt comprises a query submitted by a user.

5. The method of claim 1, wherein the prompt comprises a chain-of-thought (CoT) prompt.

6. The method of claim 1, wherein the set of hierarchy characters comprises —, ⊢, ∈, and |.

7. The method of claim 1, wherein the attribute delimiter comprises a semi-colon.

8. A non-transitory computer-readable storage medium coupled to one or more processors and having instructions stored thereon which, when executed by the one or more processors, cause the one or more processors to perform operations for providing analytics over multi-dimensional, hierarchical data using large language models (LLMs), the operations comprising:

- retrieving data from a data store, the data being in a storage format comprising multiple rows, the data comprising multiple dimensions in a hierarchy, at least one dimension having a sub-hierarchy, each dimension recorded in a row of the multiple rows;
- converting the data from the storage format to an analytics format by processing the data through preprocessing to convert the storage format to an intermediate data structure, a forward pass to traverse the intermediate data structure row-by-row and provide an intermediate text dataset, and a backwards pass to provide the analytics format from the intermediate text dataset, the analytics format comprising a set of nodes, each node representing a row of a dimension of the multiple dimensions, a set of hierarchy characters, one or more hierarchy characters separating two or more nodes to represent a hierarchical relationship between nodes as a parent node and child node relationship, and an attribute delimiter to separate attribute values of a node;
- generating a prompt that references the data in the analytics format;
- transmitting the prompt to a LLM system; and
- receiving a response to the prompt from the LLM system.

9. The non-transitory computer-readable storage medium of claim 8, wherein the data is retrieved from the data store in response to determining that a review booklet is open concurrent with receiving a query from a user.

10. The non-transitory computer-readable storage medium of claim 8, wherein at least one dimension of the multiple dimensions comprises a sub-hierarchy represented using a sub-set of hierarchy characters of the set of hierarchy characters.

11. The non-transitory computer-readable storage medium of claim 8, wherein the prompt comprises a query submitted by a user.

12. The non-transitory computer-readable storage medium of claim 8, wherein the prompt comprises a chain-of-thought (CoT) prompt.

13. The non-transitory computer-readable storage medium of claim 8, wherein the set of hierarchy characters comprises —, ⊢, ∈, and |.

14. The non-transitory computer-readable storage medium of claim 8, wherein the attribute delimiter comprises a semi-colon.

15. A system, comprising:

a computing device; and a computer-readable storage device coupled to the computing device and having instructions stored thereon which, when executed by the computing device, cause the computing device to perform operations for providing analytics over multi-dimensional, hierarchical data using large language models (LLMs), the operations comprising:

retrieving data from a data store, the data being in a storage format comprising multiple rows, the data comprising multiple dimensions in a hierarchy, at least one dimension having a sub-hierarchy, each dimension recorded in a row of the multiple rows;

converting the data from the storage format to an analytics format by processing the data through preprocessing to convert the storage format to an intermediate data structure, a forward pass to traverse the intermediate data structure row-by-row and provide an intermediate text dataset, and a backwards pass to provide the analytics format from the intermediate text dataset, the analytics format comprising a set of nodes, each node representing a row of a dimension of the multiple dimensions, a set of hierarchy characters, one or more hierarchy characters separating two or more nodes to represent a hierarchical relationship between nodes as a parent node and child node relationship, and an attribute delimiter to separate attribute values of a node;

generating a prompt that references the data in the analytics format;

transmitting the prompt to a LLM system; and receiving a response to the prompt from the LLM system.

16. The system of claim 15, wherein the data is retrieved from the data store in response to determining that a review booklet is open concurrent with receiving a query from a user.

17. The system of claim 15, wherein at least one dimension of the multiple dimensions comprises a sub-hierarchy represented using a sub-set of hierarchy characters of the set of hierarchy characters.

18. The system of claim 15, wherein the prompt comprises a query submitted by a user.

19. The system of claim 15, wherein the prompt comprises a chain-of-thought (CoT) prompt.

20. The system of claim 15, wherein the set of hierarchy characters comprises —, ⊢, ∈, and |.

* * * * *